US009987965B2

(12) United States Patent
Flathers

(10) Patent No.: US 9,987,965 B2
(45) Date of Patent: Jun. 5, 2018

(54) SAFETY DEVICE FOR TOWING TRAILER

(71) Applicant: Don G. Flathers, Marshalltown, IA (US)

(72) Inventor: Don G. Flathers, Marshalltown, IA (US)

( * ) Notice: Subject to any disclaimer, the term of this patent is extended or adjusted under 35 U.S.C. 154(b) by 0 days. days.

(21) Appl. No.: 14/804,903

(22) Filed: Jul. 21, 2015

(65) Prior Publication Data
US 2016/0016501 A1    Jan. 21, 2016

Related U.S. Application Data

(60) Provisional application No. 62/026,963, filed on Jul. 21, 2014.

(51) Int. Cl.
  *B60P 3/40* (2006.01)
  *B60D 1/30* (2006.01)
  *B60D 1/66* (2006.01)
  *B62D 53/10* (2006.01)

(52) U.S. Cl.
  CPC ............... *B60P 3/40* (2013.01); *B60D 1/30* (2013.01); *B60D 1/66* (2013.01); *B62D 53/10* (2013.01)

(58) Field of Classification Search
  CPC .. B60P 3/40; B60D 1/30; B60D 1/167; B60D 1/583
  USPC ....................................................... 280/402
  See application file for complete search history.

(56) References Cited

U.S. PATENT DOCUMENTS

| 4,405,147 A | * | 9/1983 | Horsman | ................. | B60D 1/06 280/442 |
| 5,382,041 A | * | 1/1995 | Keith | ....................... | B60D 1/07 280/426 |
| 5,984,616 A | * | 11/1999 | Youmans | ................ | B60P 3/125 280/402 |
| 6,764,092 B1 | * | 7/2004 | Greaves, Jr. | ............. | B60D 1/00 280/402 |
| 6,820,887 B1 | * | 11/2004 | Riggle | ............... | B62D 53/0864 280/405.1 |

* cited by examiner

*Primary Examiner* — Joseph M Rocca
*Assistant Examiner* — Felicia L. Brittman
(74) *Attorney, Agent, or Firm* — McKee, Voorhees & Sease, PLC

(57) ABSTRACT

An intermediate towing device is provided for use between a tow vehicle and a towed vehicle. The towing device provides for a transfer of weight between the towed vehicle to the towing device to provide for a smoother ride while pulling or towing a towed vehicle. A steering assembly of the intermediate towing device provides for the transfer from a change in direction from the tow vehicle to the towing device via linkages and swiveling devices. Therefore, as the tow vehicle changes direction, this will be transferred to the wheels of the towing device to provide for greater control in both a forward and rear ward direction. Furthermore, a hitch connecter may be positioned between the tow vehicle and the towing device to provide for even greater control and auto steering of the intermediate towing device via the change in direction of the towed vehicle.

19 Claims, 9 Drawing Sheets

SAFETY DEVICE FOR TOWING TRAILER

CROSS-REFERENCE TO RELATED APPLICATIONS

This application claims priority under 35 U.S.C. § 119 to provisional application Ser. No. 62/026,963, filed Jul. 21, 2014, which is herein expressly incorporated by reference in its entirety.

FIELD OF THE INVENTION

The invention relates generally to a towing trailer. More particularly, but not exclusively, the invention relates to a trailer including safety features including, but not limited to, weight transfer mechanisms, auto-steering elements, and other elements to aid in the transport of the trailer.

BACKGROUND OF THE INVENTION

The use of campers and other recreational vehicles which are towed behind a pick-up truck or other light-duty vehicle have increased dramatically over the years. The number of families who abandon traditional tents in favor of large campers has driven trailer manufacturers to increase the size and features available. With increased features and increased size comes an increase in the weight of the trailer.

Existing towing trailers have safety issues in that the towing trailer increases the down force on the back-end of the towing vehicle and, consequently, raises the towing vehicle's front-end. This causes visibility, steering, and braking issues for the towing vehicle. This may also cause the towing trailer to be susceptible to tipping or roll-over.

Therefore, there is a need in the art for a towed trailer that can connect to additional towed trailers, vehicles, and the like that includes safety features for traveling with the towed devices.

SUMMARY OF THE INVENTION

It is therefore a primary object, feature, and/or advantage of the invention to overcome and/or improve on deficiencies in the art.

It is another object, feature, and/or advantage of the invention to provide to transfer the weight of a towed vehicle from the tow vehicle to an intermediate trailer.

It is still another object, feature, and/or advantage of the invention to provide a device that includes an auto-steering feature to more closely follow a tow vehicle.

It is yet another object, feature, and/or advantage of the invention to provide a linkage connection at a hitch of a tow vehicle to improve on the steering and following of the tow vehicle by a connected vehicle.

It is a further object, feature, and/or advantage of the invention to provide a rear hitch of an intermediate device that includes stoppers to aid in the alignment of a towed vehicle connected to the intermediate device.

It is yet a further object, feature, and/or advantage of the invention to mitigate overturning of a towed vehicle.

It is still yet a further object, feature, and/or advantage of the invention to allow for various types of connecting members to attach to both the front and rear of an intermediate towing device to improve safety and/or control in towing a towed vehicle.

These and/or other objects, features, and advantages of the invention will be apparent to those skilled in the art. The invention is not to be limited to or by these objects, features and advantages. No single embodiment need provide each and every object, feature, or advantage.

According to at least some aspects of the invention, an intermediate towing device is provided. The towing device includes a frame comprising a forward hitch for engaging the towing vehicle and a rear hitch for engaging the towed vehicle, wheels operatively attached to the frame, and a steering assembly operatively attached to the wheels. The steering assembly comprises a linkage system connected to the wheels to turn the when in a similar manner as the direction of travel of the towing vehicle.

The steering assembly can also include at least one steering swivel attached to a plurality of linkage arms, with at least one steering swivel configured to translate the turning of the towing vehicle to the wheels of the frame. Wheel hubs are also included for connecting the wheels to the frame, with brakes operatively connected to the wheel hubs to aid in slowing.

According to further aspects of the invention, an intermediate towing device is provided that includes a frame comprising a forward hitch for engaging the towing vehicle and a rear hitch for engaging the towed vehicle, wheels operatively attached to the frame, and a hitch connector extending between the towing vehicle and the forward hitch of the frame. The hitch connector is operatively connected to the wheels to provide turning of the wheels to coincide with a similar direction of travel of the towing vehicle.

According to still further aspects of the invention, an assembly for use in an intermediate position between a towing vehicle and a towed vehicle is provided. The assembly includes an intermediate towing vehicle comprising a frame comprising a forward hitch for engaging the towing vehicle and a rear hitch for engaging the towed vehicle, wheels operatively attached to the frame, a steering assembly operatively attached to the wheels, and a hitch connector extending between the towing vehicle and the forward hitch of the frame. The hitch connector can be connected to the steering assembly of the intermediate towing vehicle via a linkage system to provide turning of the wheels to coincide with a similar direction of travel of the towing vehicle.

Figure 1:
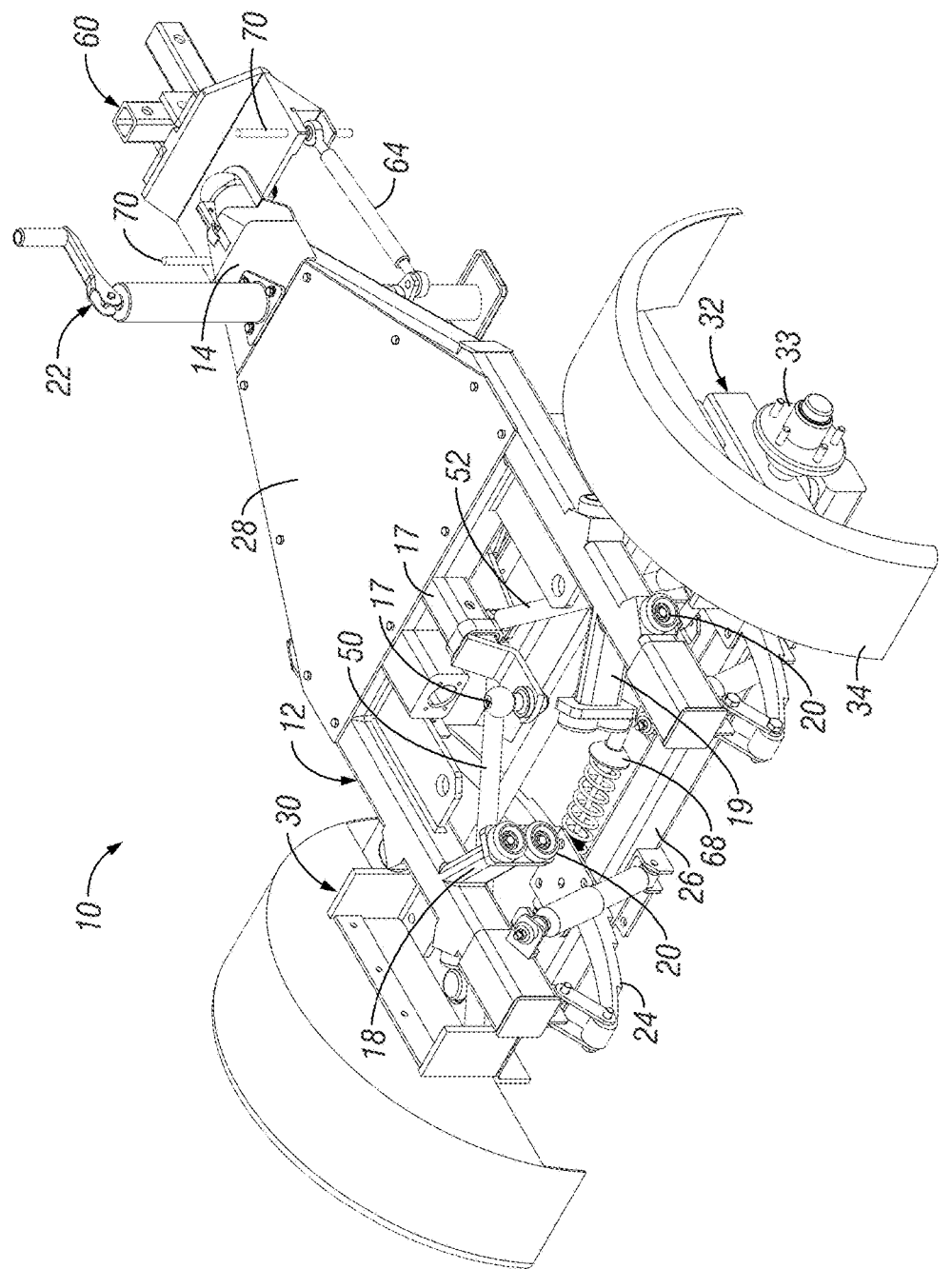
FIG. 1 is a perspective view of an intermediate towing device according to aspects of the invention.
Figure 2:
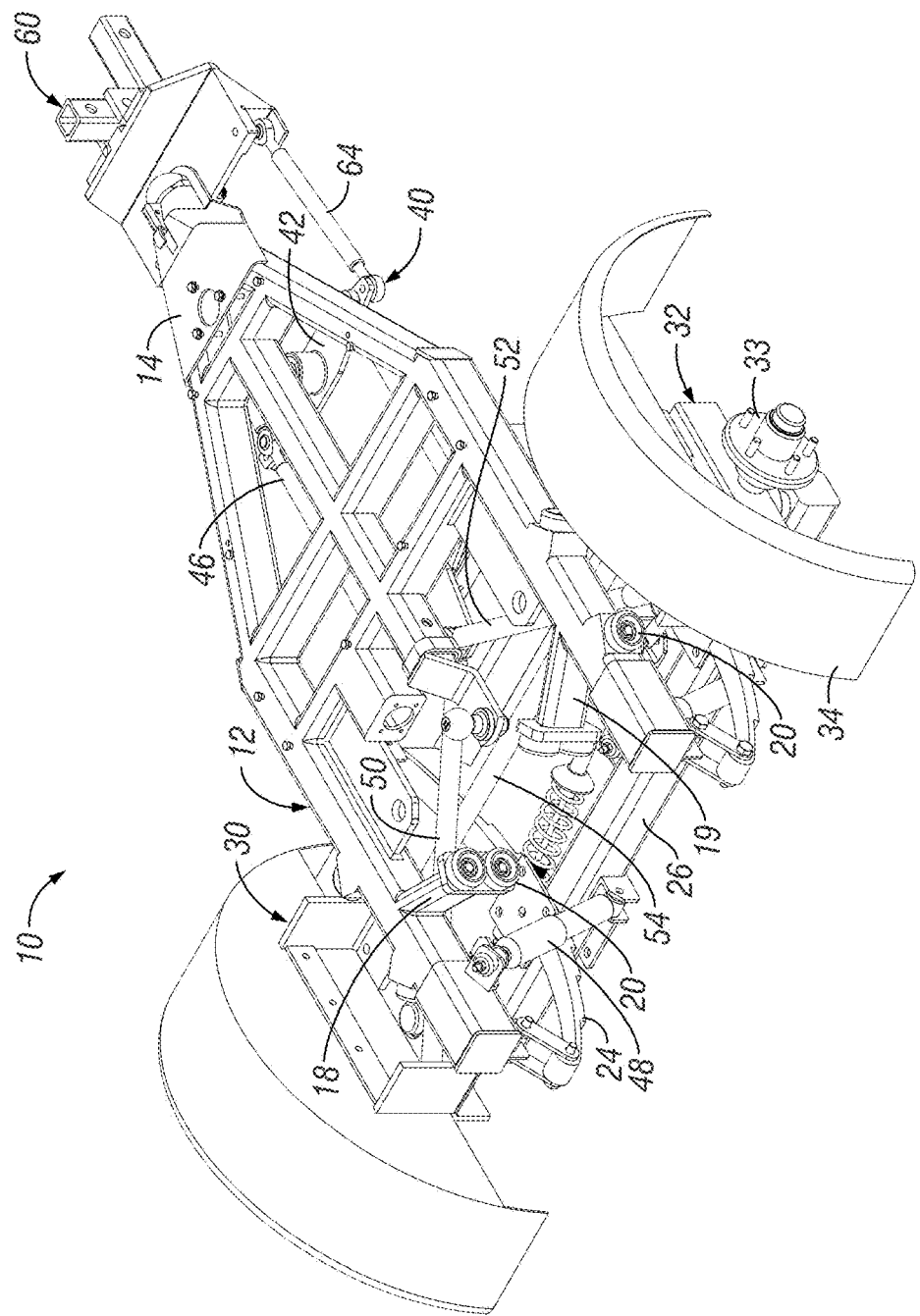
FIG. 2 is another perspective view of the towing device according to additional aspects of the invention.
Figure 3:
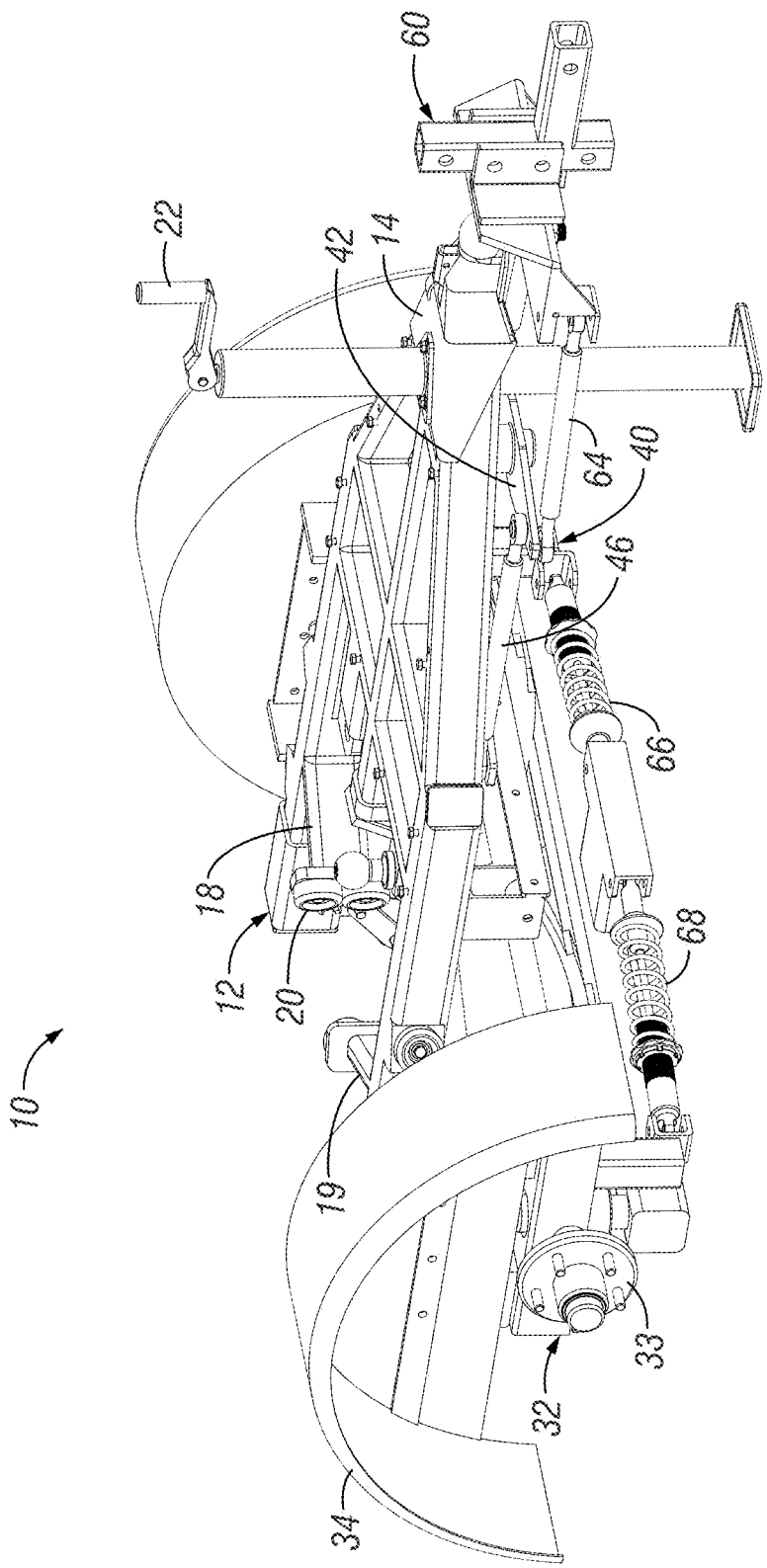
FIG. 3 is a front perspective view of the towing device.

Various embodiments of the invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENTS

The invention is directed towards a towing device 10, such as an intermediate towing device, which can be used between a tow vehicle and a towed vehicle. For example, a tow vehicle could be a truck, semi, utility vehicle, or any other vehicle capable of towing a trailer or other device. The towed vehicle could be any sort of trailer or other vehicle being towed by a tow vehicle. The intermediate towing device 10, according to aspects of the invention, is positioned between the tow vehicle and the towed vehicle such that the towing of the towed vehicle will be smoother and easier. This is accomplished in part by transferring the weight of the tow vehicle to the intermediate towing device 10. This transfer of weight will make it easier for the tow vehicle to pull the towed vehicle and intermediate towing device 10 and will provide greater control, such as to prevent or otherwise mitigate swaying of the towed vehicle as the combination of vehicles travels down a road. As will be appreciated, additional aspects of the invention will provide for even more advantages beyond the transfer of the weight of the tow vehicle, which can aid in the control of the towed vehicle in both a forward and rearward manner. Furthermore, it should be appreciated that, while the intermediate towing device will be shown and described with respect to the figures disclosed herein, the invention contemplates additional variations which will be obvious to those skilled in the art to provide for smoother towing of a towed vehicle with use of the intermediate towing device 10.

Therefore, FIGS. 1-9 provide exemplary depictions of an intermediate towing device 10 including and according to aspects of the invention. The towing device 10 comprises a main frame 12. The main frame 12 may comprise bars, such as square tubing, that is welded together or cast to form the main frame 12. While the figures disclose a main frame of a certain shape and size, it should be appreciated that this is for exemplary purposes only, and that the invention contemplates the frame 12 be variable in size and shape to accommodate for various tow vehicles and towed vehicles. The difference in size of the frame may allow for larger towed vehicles to be towed with use of the intermediate towing device 10 to provide for the smoother towing thereof.

Positioned generally at a forward end of the main frame 12 is a forward hitch 14. The forward hitch 14 is utilized to connect the towing device 10 to the tow vehicle. For example, the forward hitch 14 shown in the figures is shown to be a ball receiver such that the hitch 14 can interact with a ball hitch of a tow vehicle to connect the intermediate towing device thereto. However, it is to be appreciated that while the ball hitch is shown in the figures, the invention contemplates that generally any type of connecting hitch be used, including but not limited to, 3-point hitches, receiver tubes, and generally any other type of trailer hitch or tow hitch that is utilized with vehicles.

At an opposite end of the main frame 12 of the towing device 10 is a rear hitch 16. The rear hitch 16, shown to be a ball hitch in the figures herein, is utilized to attach to the towed vehicle. The receiver 17, which is shown to be the ball hitch, could be generally any type of hitch as well. For example, straight hitches could be utilized and included to be attached with the rear hitch 16 of the towing device 10. As is shown, the rear hitch 16 is generally surrounded by a first interior arm 18 and a second interior arm 19 of the main frame 12. The interior arms 18, 19 are angled towards a generally longitudinal axis of the towing device 10. The arms 18, 19 also include stoppers 20 positioned at their ends. For example, the stoppers 20 may be comprised rubber, or other pliable and/or resilient materials. The position, shape, and orientation of the interior arms 18, 19 provide for greater stability of an attached towed vehicle to the towing device 10. For example, when a triangle-shaped hitch of a towed vehicle is attached, the orientation of the triangle hitch will be similar to that of an angular orientation of the first and second interior arms 18, 19. Therefore, when the towing device 10 is in either a forward or rearward direction, the stoppers 20 positioned at the ends of the interior arms 18, 19 will interact with a portion of the towed vehicle to provide for likewise travel direction of the towing device. This is advantageous, as the towing device 10 includes a steering assembly 40, which will be explained herein. While the triangle-oriented interior arms 18, 19 are shown in the figures, it should be appreciated that other orientations may be included. For example, a plate (not shown) may be connected to the stopper ends of the angular-oriented interior arms to act as an extension or provide alignment stoppers or straight hitches as opposed to triangular shaped hitches. For example, some towed vehicles include a straight hitch wherein the angular orientation of the interior arms may not interact with the straight hitch to provide as great of control. Therefore, the extension plates or other oriented alignment of the arms may provide greater interaction to provide greater stability and/or control to the vehicle. Furthermore, it is to be appreciated, that generally any orientation, length, size, and/or number of stoppers may be included at the interior arms 18, 19 to provide for said stability and control of the controlled vehicle via the towing device 10.

Still additional features of the towing device 10 as shown in the figures include a front jack 22 positioned near the forward hitch 14 of the towing device 10. The front jack 22 is utilized to provide stability and an anchor for the towing device 10 when not connected to a tow vehicle or any other vehicle. Additionally, one or more leaf springs 24 are shown to be positioned at a generally rear portion of the towing device 10. The leaf springs work with the axle and wheels of the towing device to provide for cushioning of the towing device as it travels down the road. Furthermore, one or more shock absorbers 48 are included at a rear portion of the main frame 12 to also provide for cushioning and/or support of the towing device as it travels and comes across any obstructions or other bumps or defects in the road.

The leaf springs and/or shock absorbers may interact with an axle 26 extending between left and right sides of the towing device 10. As shown best in FIG. 5, the axle 26 extends generally from one side of the main frame 12 to the other. Connected to and extending from the axle are a left wheel hub assembly 30 and a right wheel hub assembly 32. The orientations of left and right are understood to be indicative of the side of the trailer when moving in a forward direction such as by being towed by a vehicle in a forward manner. However, as the sides are generally mirror images of one another, the directions of left and right may be interchangeable as well. Therefore, the leaf springs 24 and/or shock absorbers 48 may be extending from the main frame 12 to the axle 26 to provide stability and cushioning thereof. Upwardly connected to the axle 26, as mentioned, are left wheel hub assemblies 30 and right wheel hub assemblies 32. The wheel hub assemblies further include a left wheel hub 31 and a right wheel hub 33. The wheel hubs 31, 33 are utilized to attach a tire or tires (not shown) to the wheel hubs. The attachment of the tire or tires to the wheel hubs can be done in any manner as is known in the art. Furthermore, while not shown, it is contemplated that a braking system be included with the wheel hubs 31, 33 to provide additional braking support for the towing device beyond the braking of the tow vehicle. An electrical connection can be utilized to attach between the tow vehicle and the towing device 10 so as to provide an electrical connection to one or more electric brakes at the wheel hubs to provide braking or wheels of the towing device upon a braking of the tow vehicle itself. Additional types of braking systems may also be included and are intended to be a part of the disclosure herein. In addition, a fender 34 may be positioned around each of the wheels on the left and right sides of the towing device 10, as is shown in FIGS. 1-5. The fenders are included to protect the wheels and other components from debris kicked up by a wheel. As is shown in the figures, the left and right fenders 34 are connected to the left and right wheel hub assemblies 30, 32.

Figure 4:
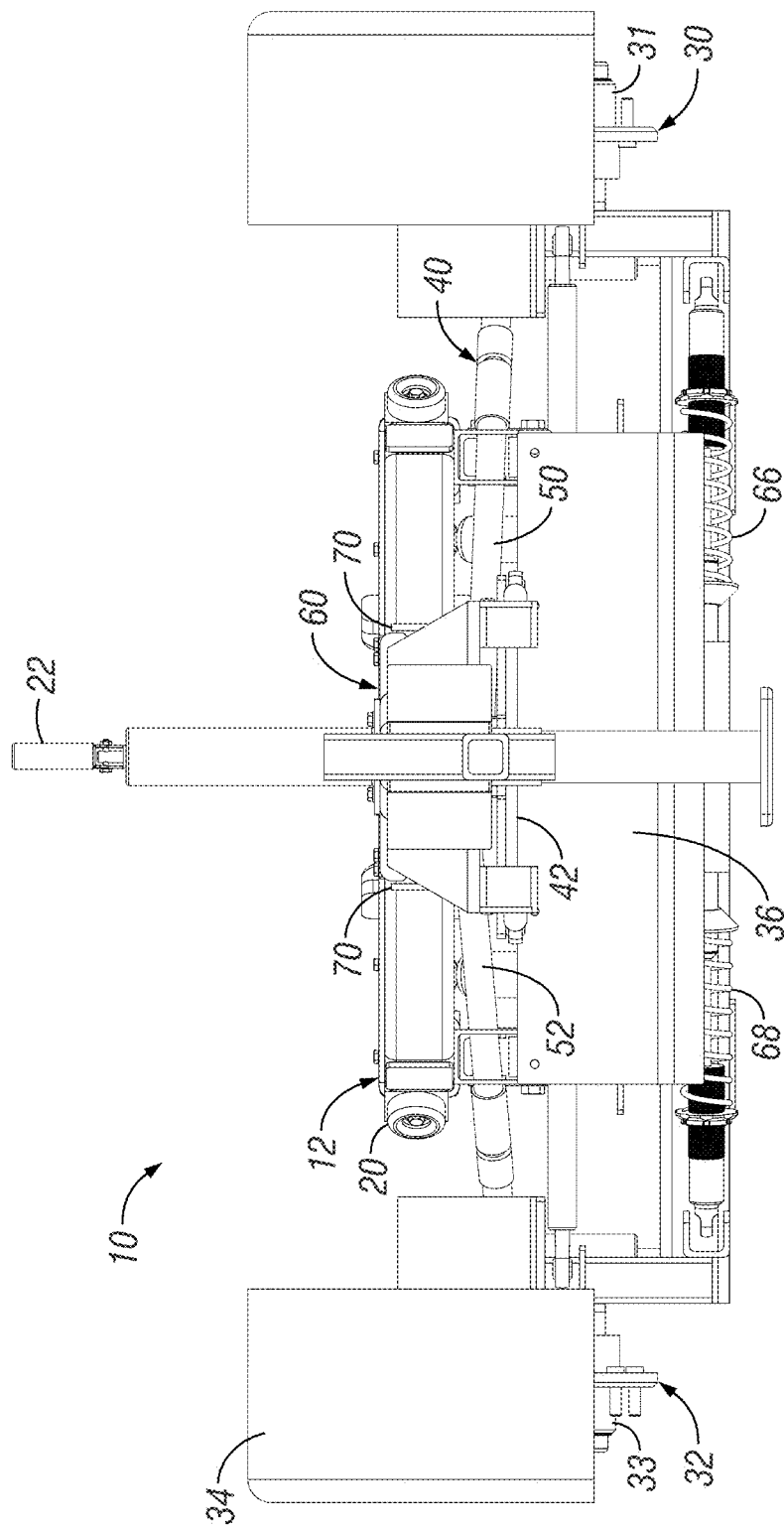
FIG. 4 is a front elevation view of a towing device according to aspects of the invention.
Figure 5:
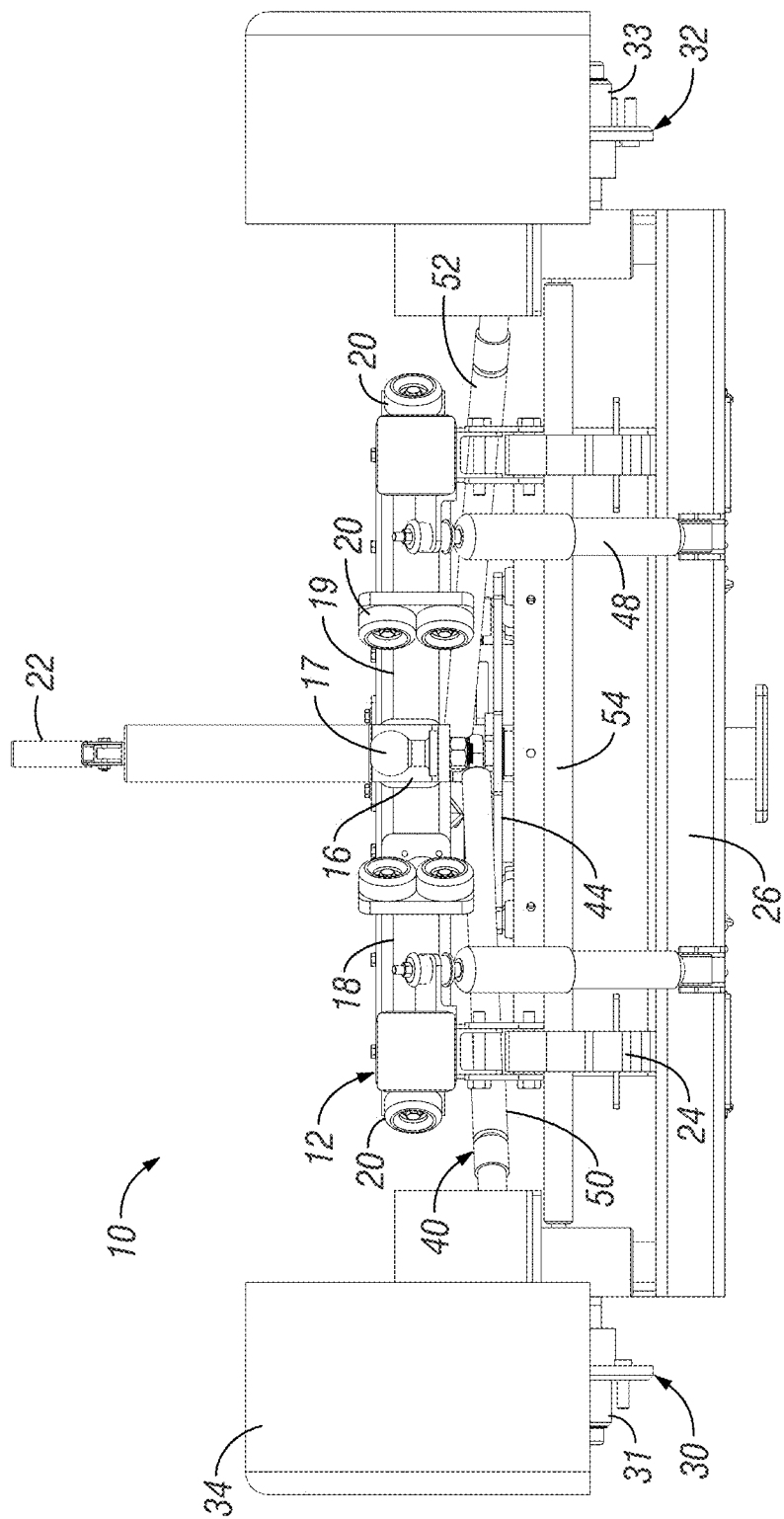
FIG. 5 is a rear elevation view of the towing device of FIG. 4.
Figure 6:
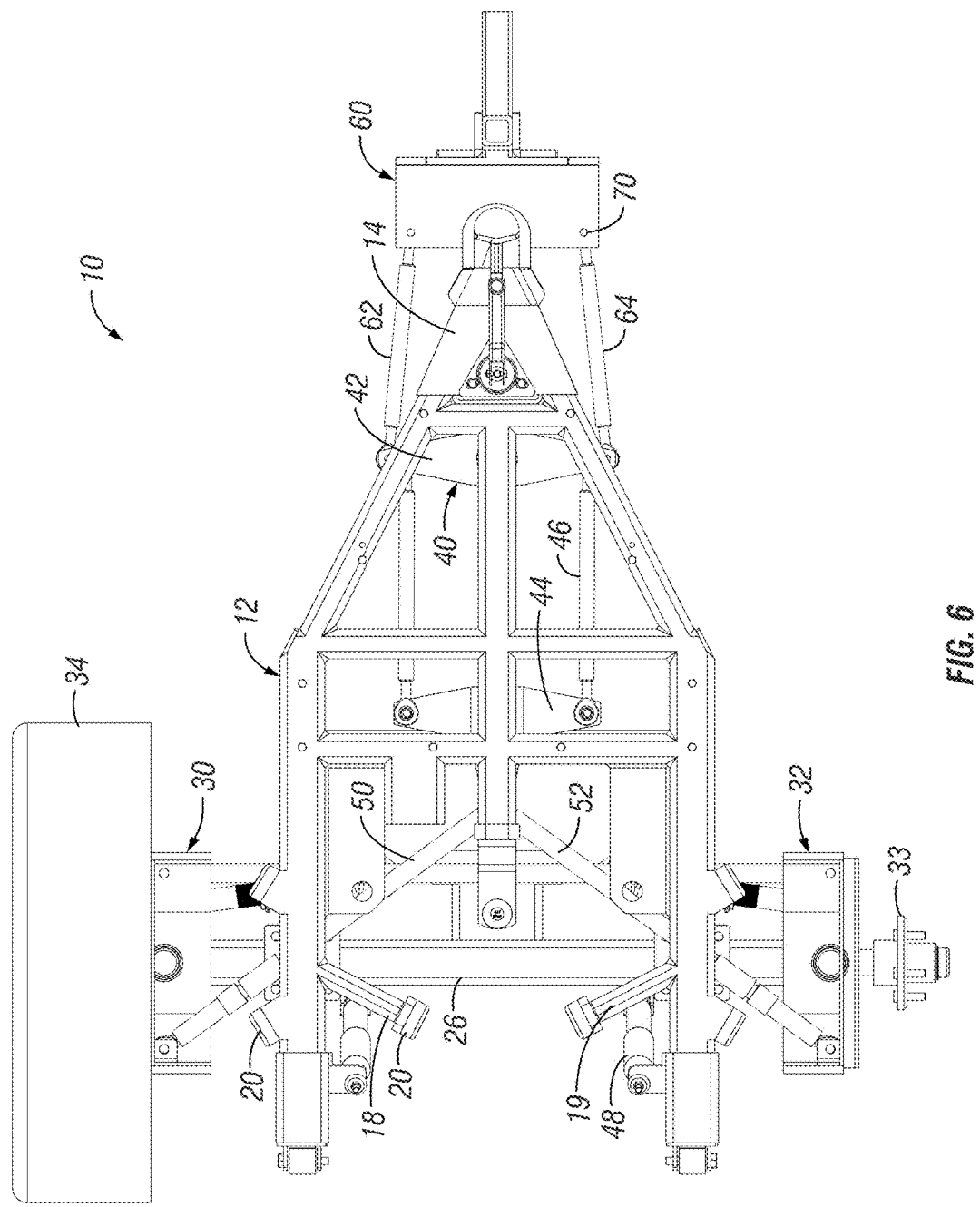
FIG. 6 is a top elevation view of a towing device showing aspects of the invention.

Still further components of the towing device 10 that may be included according to some aspects of the invention may be a cover plate 28, as is shown in FIG. 1, and a shield plate 36 as is shown best in FIG. 4. The cover plate 28, which can be a metallic or other rigid material, provides for additional support for the main frame 12 and also allows for a shelf or other member for items to be attached thereto. The shield plate 36 is a metallic or other rigid device to protect components of the towing device 10 from debris on the underside of the towing device. However, the cover plate 28 and/or shield plate 36 may not be needed in all embodiments of the towing device according to aspects of the invention.

As mentioned, the towing device 10 includes a steering assembly 40 for receiving a steering orientation from a tow vehicle and transporting said steering orientation to a towed vehicle via the towing device 10. For example, as a tow vehicle turns in either a forward or rearward direction, this change in travel orientation will need to be transferred from the tow vehicle through the towing device 10 to the towed vehicle. The intermediate device could create problems due to the added length of the towed vehicle behind the tow vehicle such that the turning is not as exact as desired. Therefore, an advantage of the intermediate towing device 10 includes said steering assembly 40 to provide for greater control and transferring said change in travel orientation from the tow vehicle to the towed vehicle. As will be understood, such a steering assembly will provide numerous advantages in addition to the transferring of weight from the tow vehicle to the intermediate towing device 10, which will provide for numerous advantages and greater control when towing a towed vehicle with the invention described herein.

Therefore, as can be seen in the figures, the steering assembly 40, according to at least some of the aspects of the invention, comprises the following. A front steering swivel 42 is connected to a rear steering swivel 44, such as by the use of linkage arms 46, which may also be known as pivot rods. The front steering swivel 42 may also be connected to the tow vehicle, such as at a hitch connecter or assembly 60 via left and right front steering tubes 62, 64. The hitch connecter 60 can be inserted into the receiver of the tow vehicle and connected to the forward hitch 14 of the intermediate towing device 10. Therefore, as the tow vehicle turns or otherwise changes direction, the hitch connecter will turn with the tow vehicle. This turning will cause a rotation of the hitch connecter 60 relative to the forward hitch 14 of the towing vehicle 10. Such a rotation will cause a push or pull to the left and right front steering tube 62, 64. The push and pull of the steering rods will then cause a swivel or rotation of the front steering swivel 42 causing a likewise effect to the rear steering swivel 44 due to the linkage arms or pivot rods 46 connecting said front steering swivel to said rear steering swivel 44. Therefore, the front and rear steering swivels are to be pivotally and rotatably connected to the main frame 12, such as by a bolt or other mechanism to allow for the rotational movement.

It should also be appreciated that the hitch connector 60 need not be included in all aspects of the invention, and instead, another connection be provided between the tow vehicle and the device 10 to transfer the change in orientation to the steering assembly 40 of the tow device 10.

Figure 7:
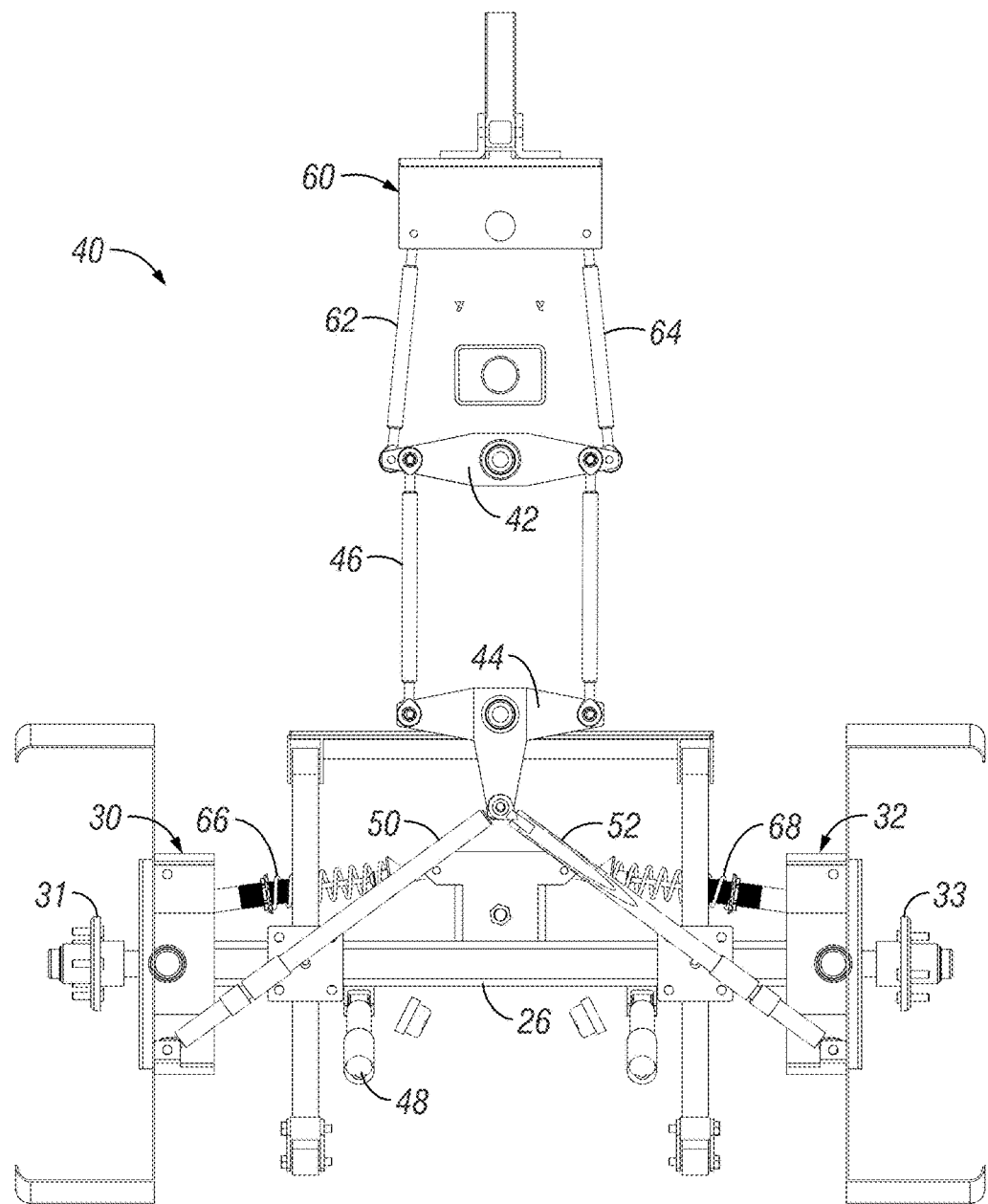
FIG. 7 is a top elevation view of a steering assembly for use with a towing device according to aspects of the invention.
Figure 8:
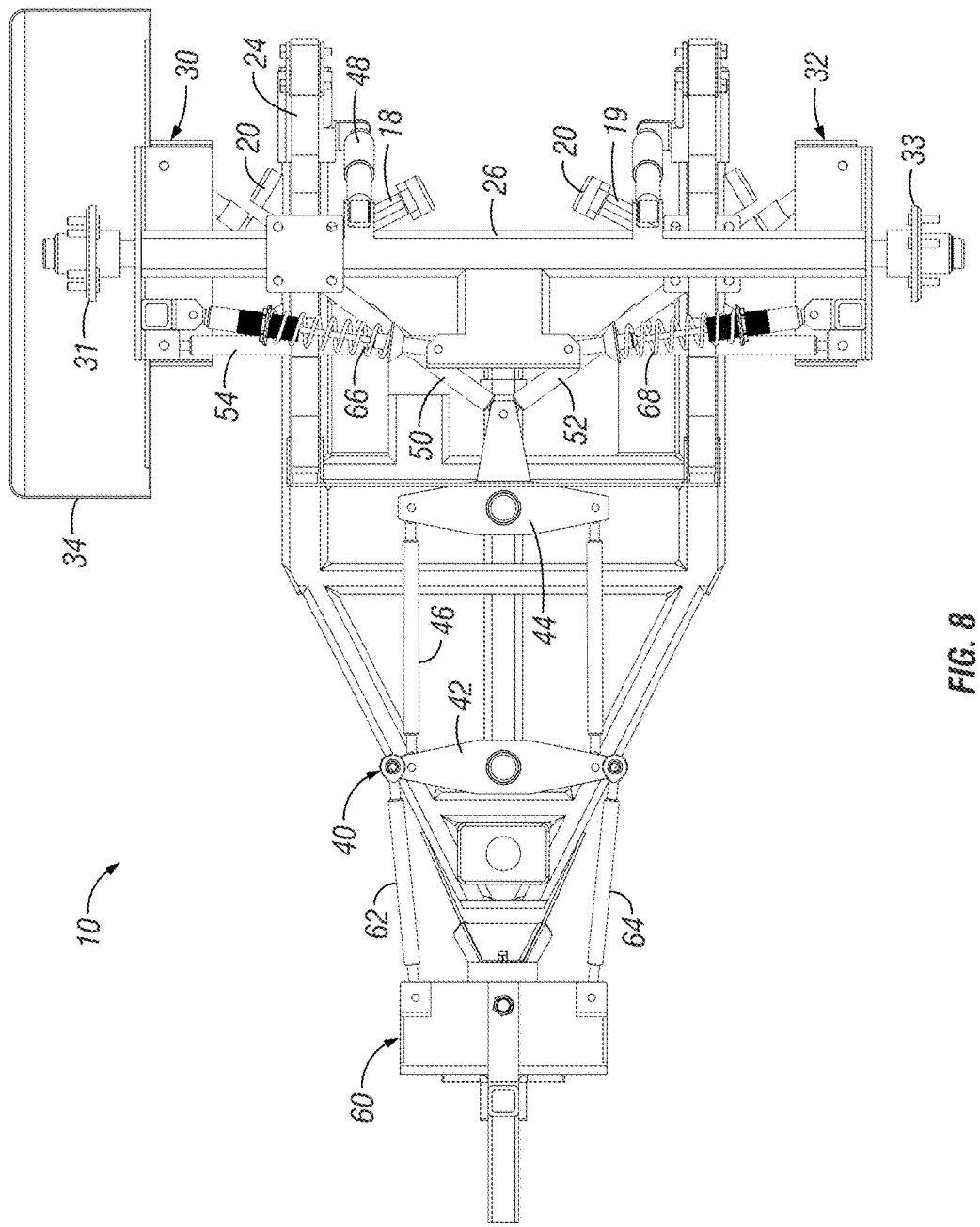
FIG. 8 is a bottom elevation view of a towing device according to aspects of the invention.
Figure 9:
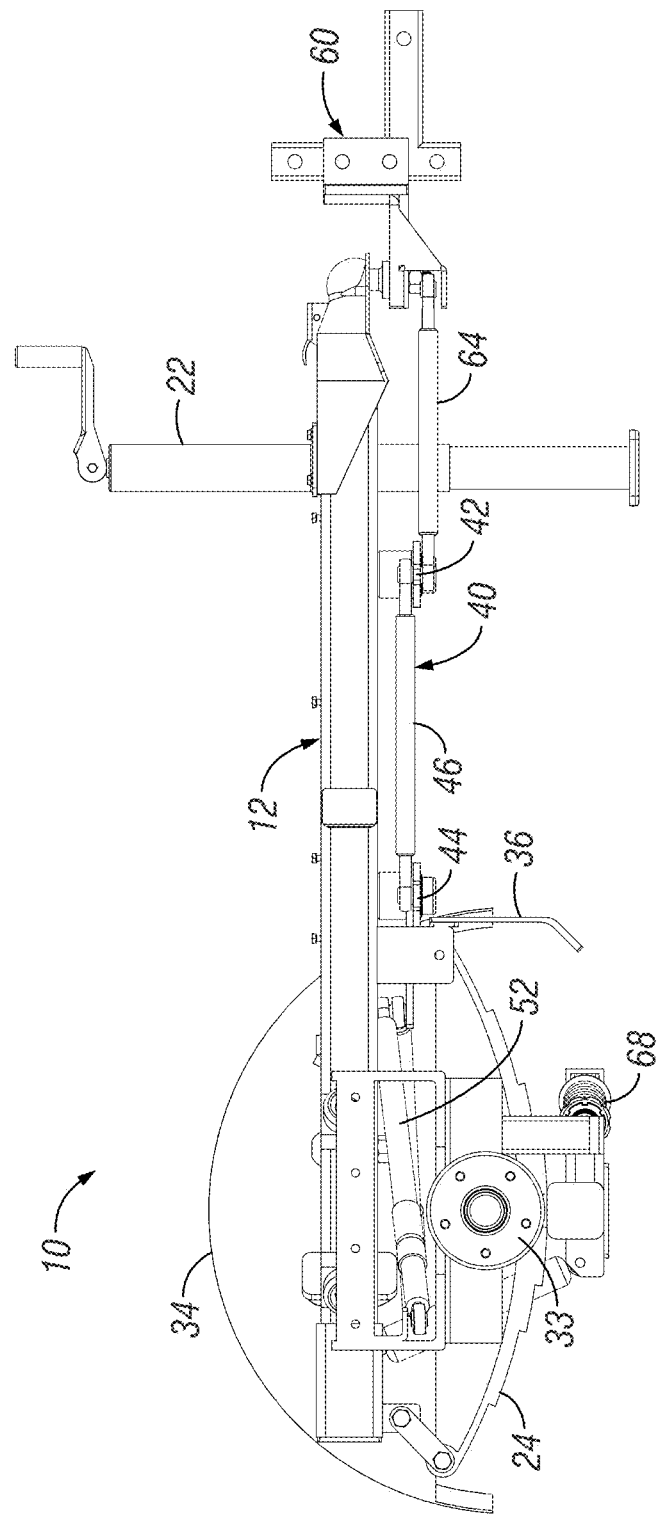
FIG. 9 is a side elevation view of a towing device according to aspects of the invention.

The rear steering swivel 44, as is shown in FIG. 7, may be generally T-shaped having a forward section connected to the front steering swivel 44 by said pivot rods 46 and a single rear section extending behind towards the rear of the towing device 10. Connected to the rear end of the rear steering swivel 44 may be left and right slider tubes 50, 52 extending at an angular orientation towards the left wheel hub assembly 30 and the left wheel hub assembly 32. The left and right slider tubes 50, 52 are rotatably and/or pivotably connected to the wheel hub assemblies 30, 32. Therefore, the rotation of the rear steering swivel 44 due to a change in orientation of the tow vehicle will provide a push and/or pull to the left and right slider tubes 50, 52, coinciding with the change in orientation thereof. This push and pull of the slider tubes 50, 52 will cause the wheels attached to the wheel hubs 31, 33 to be rotated in a likewise manner. As can be seen best in FIG. 7, the slider tubes 50, 52 are attached generally at a rear portion of the wheel hub assemblies 30, 32. Therefore, the push and/or pull of the slider tubes 50, 52 will cause the wheel assemblies 30, 32 and thus any wheels connected thereto to be rotated in a similar manner in a tow vehicle. Furthermore, while the slider tubes are shown to be attached at the rear of the wheel hub assemblies, it should be appreciated that they may also be attached at a generally front version to still provide the rotation of the wheel hub assemblies due to the combined movement of the steering assembly 40 components. Therefore, a turning of the tow vehicle can create a domino effect wherein the hitch connecter 60 rotates with the change in orientation of the tow vehicle causing a push and pull of the front steering tube 60, 64 rotating the front steering swivel 42 causing a push and pull to the linkage arms 46, which causes a rotation of the rear steering swivel 44. The rotation of the rear steering swivel 44 will provide a push and/or pull to the left and right slider tubes 52, 54 to provide a push or pull to the wheel hub assemblies 30, 32, thus rotating the wheels attached thereto, which will provide a similar change in direction or orientation as that of the tow vehicle.

Furthermore, positioned between the axle 26 and the left and right wheel hub assemblies 30, 32 are a left compression spring 66 and a right compression spring 68. The compression springs work with the movement of the left and right slider tubes 50, 52 to aid in turning the wheel such that they turn with the changing direction of the tow vehicle. Furthermore, the compression springs mitigate rotation of the wheels when the tow vehicle maintains a straight or substantially straight direction. This mitigates any transfer of swaying or swerving to the towed vehicle such that the combination of the towing devices will be maintained in a substantially straight manner. This reduction of swaying or swerving will provide numerous advantages and safety to the combination of vehicles as it travels down the road.

Still further aspects of the invention may include the inclusion of front pins 70 on the hitch connecter 60 extending upward therefrom and possibly extending through the holes connecting the left front and right front steering tubes 60, 64. The pins 70 can extend upwardly from the hitch connector 60. The pins are included so as to prevent or mitigate jack-knifing of the towing device and therefore towed vehicle. For example, when a tow vehicle is reversing the combination of towed vehicle and towing device 10, it may need to turn to orient said towed vehicle 10. However, over-turning while reversing can result in jack-knifing which can damage any of the vehicles, while also providing increase possibility of injury or other damage to people and/or objects around the movement of the vehicles. The pins 70 can be included so as to interact with the front hitch 14 of the intermediate towing device to prevent over-turning and thus jack-knifing of the intermediate towing device 10 relative to the tow vehicle, so as to mitigate such risk of damage or injury.

Therefore, an intermediate towing device 10 has been shown and described, which includes numerous advantages for towing a towed vehicle with a tow vehicle. The intermediate towing device 10 is positioned generally between the tow vehicle and towed vehicle so as to improve the movement of the towed vehicle relative to the tow vehicle and both forward and rear ward directions. Advantages may include, but are limited to, the transferring of weight from the tow vehicle to the intermediate towing device 10, which lessens the stress and required power of the tow vehicle in towing said towing device and towed vehicle combination. The transfer of weight will also aid in the stability of towing, including the reduction of swaying or swerving. Furthermore, the inclusion of the steering assembly provides a sort of auto steer of wheels of the intermediate towing device 10 via the linkage system connected to the tow vehicle. This will provide for increased control of the intermediate towing device 10, and thus the towed vehicle via the tow vehicle itself. A change in direction and/or orientation of travel will be thus transferred to the towed vehicle via the steering assembly of the intermediate towing device 10.

At the rear hitch of the towing device 10 are interior arms and stoppers, which aid in the rear ward travel of the tow vehicle and attach components. The stoppers aid to align the towed vehicle with the towing device 10 so as to have greater control of the rear ward travel of any towed vehicle. Furthermore, it should be appreciated, that both the front hitch 14 and rear hitch 16 of the towing device 10 allow for float and turning of the attached tow and towed vehicles to provide for a smoother ride when connected thereto. Still other advantages obvious to those skilled in the art may be considered to be with the invention.

Therefore, an intermediate towing device 10 for use with a tow vehicle and a towed vehicle has been shown and described. The numerous advantages of the elements and aspects of the towing device will be apparent to those skilled in the art. Furthermore, it is to be appreciated that the figures shown and described herein are for exemplary purposes, and numerous changes, variations, and/or the like are intended to be included within the scope of the invention. For example, the number of wheels, the shape and size of the frame, the type of hitch connectors and/or receivers, as well as any number and type of braking systems or other electronics such as lights or lighting systems are intended to be included as part of the invention.

What is claimed is:

1. An intermediate towing device for use between a towing vehicle and a towed vehicle, the towing device comprising:
   a frame comprising a forward hitch for engaging the towing vehicle and a rear hitch for engaging the towed vehicle, wherein said forward and rear hitches are independent of one another such that the towed vehicle is able to swivel independent of the intermediate towing device;
   wheel hub assemblies operatively attached to the frame for attaching wheels to the towing device; and
   a steering assembly operatively attached to the wheels via the wheel hub assemblies, said steering assembly comprising a linkage system connected to the wheel hub assemblies to turn the wheel hub assemblies and wheels in a similar manner as the direction of travel of the towing vehicle;
   wherein said steering assembly includes a forward and rearward swivel connected via linkage arms, and wherein the rear swivel is connected to the wheel hub assemblies at a common point.

2. The intermediate towing device of claim 1, further comprising a hitch connector extending between the towing vehicle and the forward hitch of the frame.

3. The intermediate towing device of claim 2, wherein the hitch connector is connected to the steering assembly via linkage arms.

4. The intermediate towing device of claim 3, wherein said hitch connector moves in sync with the towing vehicle.

5. The intermediate towing device of claim 4, wherein turning of said towing vehicle turns the hitch connector, which activates the linkage system of the steering assembly to turn the wheels.

6. The intermediate towing device of claim 1, wherein said steering assembly further comprises at least one pin positioned through the frame and extending at least partially transverse to the length of the intermediate towing device to mitigate jack-knifing or overturning of the intermediate towing vehicle.

7. The intermediate towing device of claim 1, further comprising wheel hubs for connecting the wheels to the frame via the wheel hub assemblies.

8. The intermediate towing device of claim 7, further comprising brakes operatively connected to the wheel hubs to aid in slowing.

9. The intermediate towing device of claim 1, further comprising at least one stopper extending from the frame to aid in maintaining alignment of the towed vehicle with the intermediate towing device.

10. An intermediate towing device for use between a towing vehicle and a towed vehicle, the towing device comprising:
    a frame comprising a forward hitch for engaging the towing vehicle and a rear hitch for engaging the towed vehicle, wherein said forward and rear hitches are independent of one another such that the towed vehicle is able to swivel independent of the intermediate towing device;
    wheel hub assemblies operatively attached to the frame for attaching wheels to the towing device;
    a hitch connector extending between the towing vehicle and the forward hitch of the frame, said hitch connector operatively connected to the wheels to provide turning of the wheels to coincide with a similar direction of travel of the towing vehicle; and
    a steering assembly operatively attached to the frame and extending generally between the wheels and the hitch connector to aid in the travel of the intermediate towing device in a similar direction of the tow vehicle, said steering assembly including a forward swivel for receiving the turning information and connected to a rear swivel, wherein said rear swivel includes a common connection point for separate linkage arms extending between the rear swivel and the wheel hub assemblies.

11. The intermediate towing device of claim 10, wherein said steering assembly comprises a plurality of linkages extending from the hitch connector to the wheel hub assemblies to transfer the turning of the towing vehicle to the wheels of the intermediate towing device.

12. The intermediate towing device of claim 10, further comprising at least one pin positioned through the frame and extending at least partially transverse to the length of the intermediate towing device to mitigate jack-knifing or overturning of the intermediate towing vehicle.

13. The intermediate towing device of claim 10, wherein said hitch connector further comprises at least one blocking pin to prevent overturning of the towing vehicle relative to the intermediate towing device.

14. The intermediate towing vehicle of claim 10, further comprising wheel hubs for connecting the wheels to the frame via the wheel hub assemblies.

15. The intermediate towing device of claim 14, further comprising brakes operatively connected to the wheel hubs to aid in slowing.

16. The intermediate towing device of claim 10, further comprising compression springs operatively connected between the frame and the wheel hub assemblies to aid in controlling the turning of the wheels.

17. An assembly for use in an intermediate position between a towing vehicle and a towed vehicle, the assembly comprising:
  an intermediate towing vehicle comprising a frame comprising a forward hitch for engaging the towing vehicle and a rear hitch for engaging the towed vehicle, wheels operatively attached to the frame, and a steering assembly operatively attached to the wheels, wherein said forward and rear hitches are independent of one another such that the towed vehicle is able to swivel independent of the intermediate towing device;
  first and second pins extending at least partially transverse to the forward hitch to mitigate overturning by providing blocking portions to provide stopping points for alerting an operator when to stop turning; and
  a hitch connector extending between the towing vehicle and the forward hitch of the frame;
  said hitch connector connected to the steering assembly of the intermediate towing vehicle via a linkage system to provide turning of the wheels to coincide with a similar direction of travel of the towing vehicle.

18. The assembly of claim 17, further comprising at least one steering swivel to provide rotational movement from the linkage system to the wheels.

19. The assembly of claim 17, further comprising at least one brake connected to a wheel of the intermediate towing vehicle to aid in slowing and stopping.

\* \* \* \* \*